US010936789B2

(12) United States Patent
Bhatti et al.

(10) Patent No.: US 10,936,789 B2
(45) Date of Patent: Mar. 2, 2021

(54) DISPLAY SYSTEM AND METHOD FOR DISPLAYING MESSAGES IN A PASSENGER COMPARTMENT OF A VEHICLE

(71) Applicant: TELEVIC RAIL NV, Izegem (BE)

(72) Inventors: Jabran Bhatti, Ostend (BE); Dirk Van Den Wouwer, Melsele (BE); Frank Delporte, Passendale (BE)

(73) Assignee: Televic Rail NV, Izegem (BE)

( * ) Notice: Subject to any disclaimer, the term of this patent is extended or adjusted under 35 U.S.C. 154(b) by 0 days.

(21) Appl. No.: 16/064,555

(22) PCT Filed: Dec. 22, 2016

(86) PCT No.: PCT/EP2016/082301
§ 371 (c)(1),
(2) Date: Jun. 21, 2018

(87) PCT Pub. No.: WO2017/109031
PCT Pub. Date: Jun. 29, 2017

(65) Prior Publication Data
US 2019/0005003 A1    Jan. 3, 2019

(30) Foreign Application Priority Data

Dec. 22, 2015    (EP) .................................... 15202198

(51) Int. Cl.
*G06F 40/106* (2020.01)
*B61L 15/00* (2006.01)
(Continued)

(52) U.S. Cl.
CPC .......... *G06F 40/106* (2020.01); *B61L 15/009* (2013.01); *G06F 16/38* (2019.01); *G06F 40/186* (2020.01)

(58) Field of Classification Search
CPC ..... G06F 17/212; G06F 17/248; B61L 15/009
See application file for complete search history.

(56) References Cited

U.S. PATENT DOCUMENTS

2006/0225037 A1* 10/2006 Glein ........................ G06F 8/38
717/117
2012/0317504 A1* 12/2012 Patel ........................ G06F 9/451
715/762
(Continued)

FOREIGN PATENT DOCUMENTS

| EP | 2930711 A1 | 10/2015 |
| WO | 2015082717 A1 | 6/2015 |
| WO | 2015197479 A1 | 12/2015 |

OTHER PUBLICATIONS

WO2015197479 english translation Title: Control Console for a Rail Vehicle and Computer-Implemented Method for Controlling a User Interface of a Rail Vehicle; Author: Heberling, Jörn; DE (Year: 2015).*

(Continued)

*Primary Examiner* — Mandrita Brahmachari
(74) *Attorney, Agent, or Firm* — Jacobsen IP Law; Krista S. Jacobsen

(57) ABSTRACT

The invention pertains to a display system for displaying messages in a passenger compartment of a vehicle, the system comprising: a display surface; a memory comprising a plurality of display templates; interfacing means adapted to retrieve information from an information system; processing means to evaluate said retrieved information and to (Continued)

select a display template from among said plurality of display templates conditionally on said evaluating; and formatting means configured to format said retrieved information in accordance with said selected template for displaying on the display surface. The invention also pertains to a corresponding method, comprising: retrieving (210) information from an information system; evaluating (220) said retrieved information; selecting (230) a display template from among a plurality of display templates conditionally on said evaluating; formatting (240) said retrieved information in accordance with said selected template; and displaying (250) said formatted information on a display surface of a display system.

8 Claims, 3 Drawing Sheets

(51) Int. Cl.
*G06F 40/186* (2020.01)
*G06F 16/38* (2019.01)

(56) References Cited

U.S. PATENT DOCUMENTS

2013/0061151 A1* 3/2013 Perry .................... G06F 9/5044
715/744
2014/0053063 A1* 2/2014 Cirrincione ............... G06F 8/38
715/235

OTHER PUBLICATIONS

Applicant's response to Written Opinion and Demand for International Preliminary Examination (Chapter II PCT) in PCT Application No. PCT/EP2016/082301 (filed Dec. 22, 2016), dated Oct. 23, 2017.
Extended European Search Report in European Application No. EP 15202198.6 (filed Dec. 22, 2015), dated Oct. 14, 2016.
International Preliminary Report on Patentability in PCT Application No. PCT/EP2016/082301 (filed Dec. 22, 2016), dated Nov. 24, 2017.
International Search Report and Written Opinion in PCT Application No. PCT/EP2016/082301 (filed Dec. 22, 2016), dated Mar. 31, 2017.

* cited by examiner

Next station: City Hall

Current Time: 14:00          ETA: 14:10

Next station: City Hall

Current Time: 14:00

Next station: City Hall

Fig. 3

DISPLAY SYSTEM AND METHOD FOR DISPLAYING MESSAGES IN A PASSENGER COMPARTMENT OF A VEHICLE

FIELD OF THE INVENTION

The present invention pertains to the field of display systems for passenger vehicles, such as trains, trams, buses, ferries, and the like.

BACKGROUND

Modern display systems used in passenger vehicles are used to display a variety of information that is of interest to the passengers, such as the next scheduled stop, the time of day, the vehicle's speed, etc.

When one of the items of information to be displayed is unavailable due to a malfunction of the system that supplies the information or because the given datum is not relevant in the given conditions, these display systems may display empty fields, error messages, or even meaningless signs, while other information that is available and relevant may not be displayed correctly. This may be confusing and annoying to passengers, who fail to receive the information that they rely on.

Accordingly, there is a need for display systems and methods that at least partially overcome these problems.

SUMMARY

According to an aspect of the present invention, there is provided a display system for displaying messages in a passenger compartment of a vehicle, the system comprising: a display surface; a memory comprising a plurality of display templates; interfacing means adapted to retrieve information from an information system; processing means to evaluate said retrieved information and to select a display template from among said plurality of display templates conditionally on said evaluating; and formatting means configured to format said retrieved information in accordance with said selected template for displaying on the display surface. The retrieving of the information comprises requesting a plurality of fields of information and the evaluating of the information comprises verifying whether information has been received for each of said plurality of fields.

It is an advantage of the present system that error conditions of the display system and subsequent display of error messages on the display surface of a passenger vehicle can be avoided, ensuring smooth operation and a "clean" viewing experience regardless of the availability and correctness of the required data. It is a further advantage of the present invention that information content which may vary significantly from one point in time to the next (e.g., the availability of connections to other means of transportation at different stations) can be displayed correctly without necessitating the permanent reservation of a certain space on the display surface.

It is a specific advantage of the invention that the display layout can be suitably adapted to the absence of certain data.

In an embodiment of the display system according to the present invention, the evaluating of the information comprises evaluating metadata associated with the received information, the metadata being received along with said received information.

It is an advantage of this embodiment that the display layout can be suitably adapted to the nature of certain data that is received for display.

In a particular embodiment, the metadata comprises one or more of an expiry time of said received information, a source of said received information, and a condition to be met for said received information to be displayed.

According to an aspect of the present invention, there is provided a passenger vehicle comprising the display system as described above.

Passenger vehicles as used herein include, without limitation, trains, trams, buses, ferries, and the like.

According to an aspect of the present invention, there is provided a method for displaying messages in a passenger compartment of a vehicle, the method comprising: retrieving information from an information system; evaluating said retrieved information; selecting a display template from among a plurality of display templates conditionally on said evaluating; formatting said retrieved information in accordance with said selected template; and displaying said formatted information on a display surface of a display system. The retrieving of the information comprises requesting a plurality of fields of information and the evaluating of the information comprises verifying whether information has been received for each of said plurality of fields.

According to an aspect of the present invention, there is provided a computer program product comprising code means configured to cause a processor to carry out the steps of the method described above.

The technical effects and advantages of embodiments of the method and the computer program product according to the present invention correspond, mutatis mutandis, to those of the corresponding embodiments of the display system according to the present invention.

BRIEF DESCRIPTION OF THE FIGURES

These and other features and advantages of embodiments of the present invention will now be described in more detail with reference to the attached drawings, in which:

FIG. 3 provides examples of different display templates for a given display surface.

DESCRIPTION OF EMBODIMENTS

Figure 1:
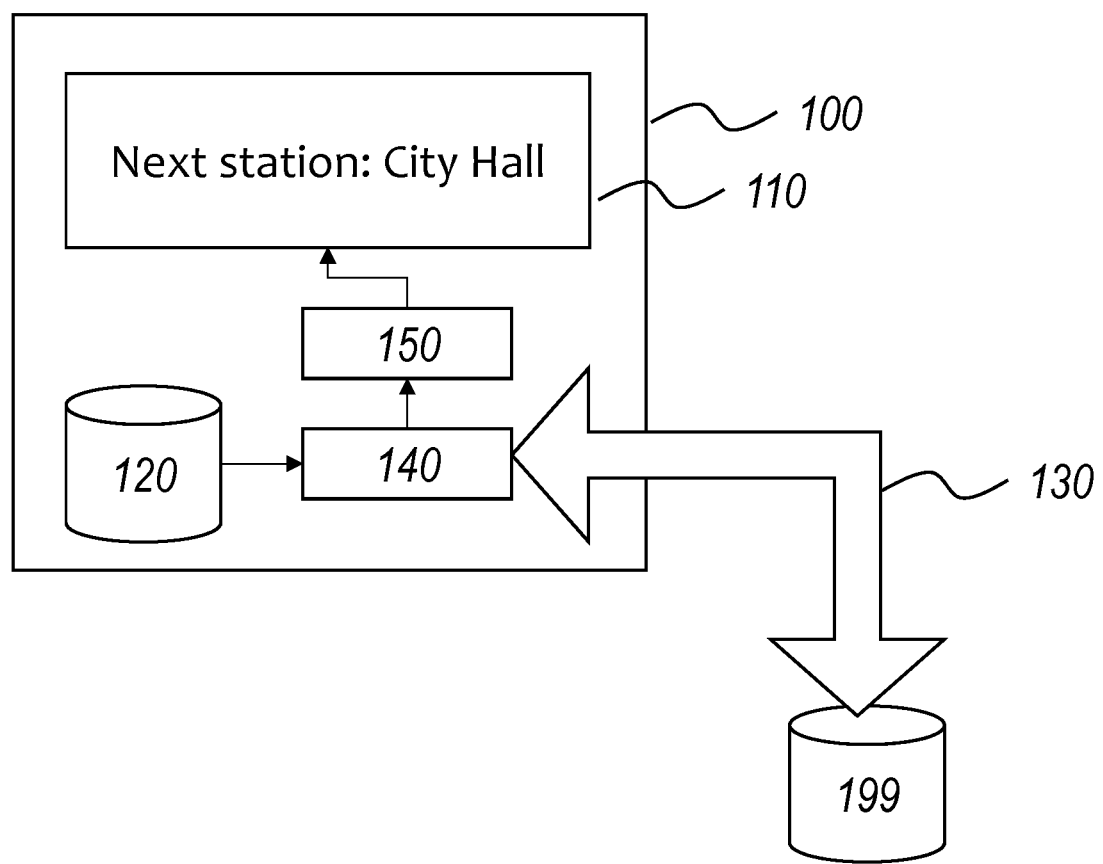
FIG. 1 schematically illustrates an embodiment of the display system according to the present invention.

FIG. 1 schematically illustrates a display system 100 for displaying messages in a passenger compartment of a vehicle (not shown). The system 100 comprises a display surface 110, which may for example be a TFT display, an LCD display, or a LED display.

The system 100 further comprises a memory 120 comprising a plurality of display templates. The display templates are data structures that define a possible layout of information elements on the display surface 110. Different layouts may be provided for different combinations of data elements, as illustrated without limitation in FIG. 3. The memory may be implemented non-volatile semiconductor memory (such as a flash-memory), a magnetic disc, an optical disc, or the like. The different display templates may be stored therein in any suitable format. It is preferred to use a format that is computer-readable and, to a certain extent, human readable, such as an XML format.

The system 100 is further capable of receiving information from an information system 199, which may be co-located with the system 100 (internally in the same housing, or otherwise present in the same vehicle) or accessible via a network; to this end, it has a suitable interfacing means 130. The interfacing means 130 comprises the necessary hardware and software to communicate with the information system 199; it preferably operates according to a combination of standardized protocols, such as the IEEE 802.3 "Ethernet" standard, the IEEE 802.11 "WiFi" standard, mobile data communication standards (such as GPRS, HSDPA, 3G, 4G), and the TCP/IP protocol stack. Along with the information that is useful for display in the passenger compartment, associated metadata may be received.

Such metadata may include, without limitation, one or more of an expiry time of the received information, a source of said received information (e.g. an up-to-date on-line source or a cache), and a condition to be met for said received information to be displayed (e.g. with respect to location, time-of-day, or the like). In certain applications, such as advertising, it may be useful to make the displaying of certain messages conditional on the profile of the passengers that are present in the vehicle; in such cases, the metadata may for example include an indication of the profiles which must be present for the message to be displayed.

Processing means 140 are provided to evaluate the retrieved information, in particular the metadata, if present, and to select a display template from among the plurality of display templates conditionally on said evaluating. The processing means 140 may be implemented in dedicated hardware (e.g., ASIC), configurable hardware (e.g., FPGA), programmable components (e.g., a DSP or general purpose processor with appropriate software), or any combination thereof. The same component(s) may also include other functions.

Formatting means 150, which may be implemented as part of the processing means 140 are configured to format the retrieved information in accordance with the selected template for displaying on the display surface. The formatted information is supplied to the display surface over a suitable interface in accordance with the signal format required by the display surface for correct operation.

Figure 2:
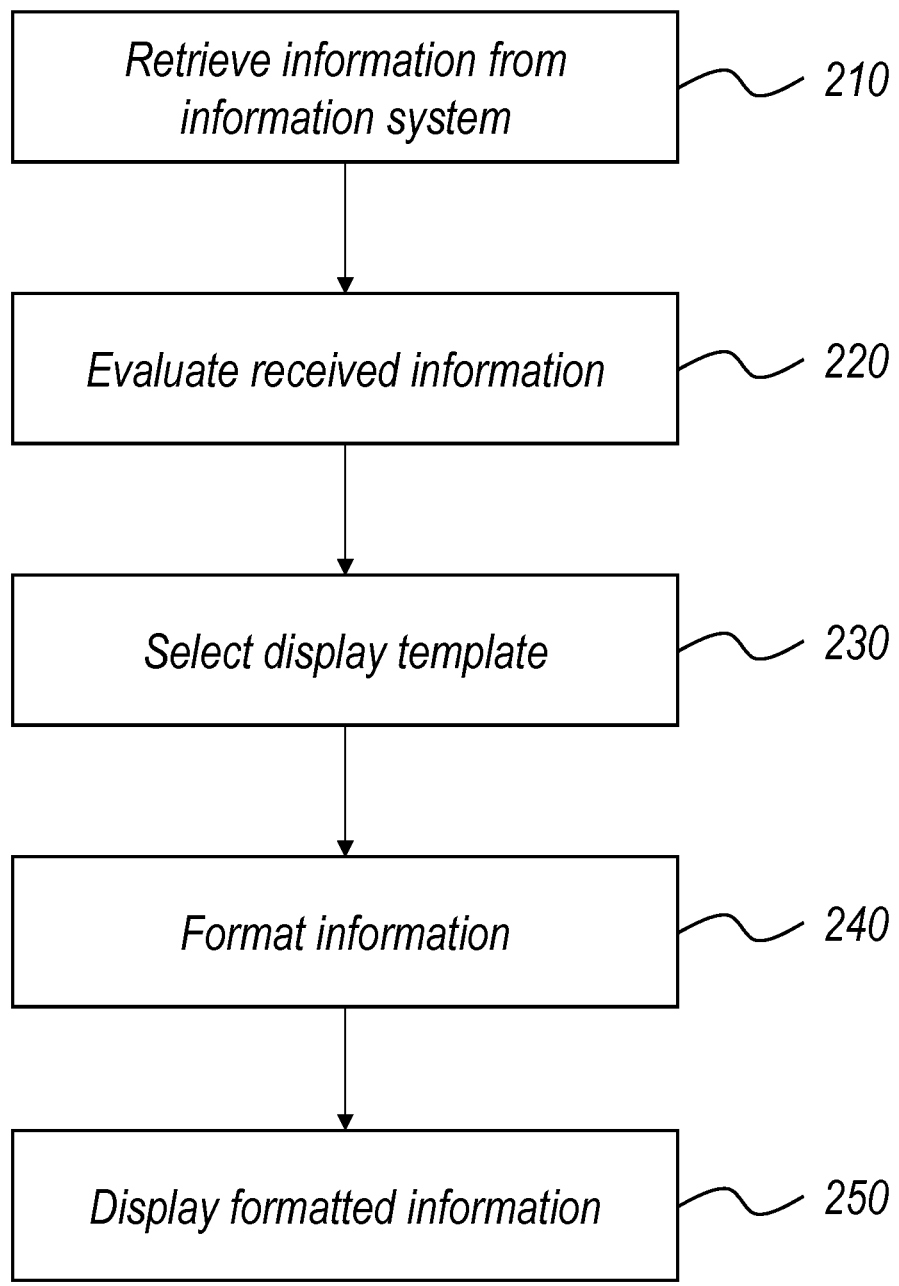
FIG. 2 provides a flow chart of an embodiment of the method according to the present invention.

FIG. 2 represents a flow chart of an embodiment of the method for displaying messages in a passenger compartment of a vehicle, in accordance with the present invention.

In an initial step, the method comprises retrieving 210 information from an information system. By "retrieving" is meant receiving information from an information system in response to an information request, which request may be formatted according to any suitable query language or transfer protocol. The request may be a standing request to receive up-to-date information, in which case the information is pushed by the information system to the display system as it becomes available. Preferably, the received information includes both the information that is useful for display in the passenger compartment, and associated metadata, as exemplified above.

The retrieved information (and in particular, if present, the metadata) is evaluated 220, for example for completeness, relevance, age or other criteria, and a suitable display template is selected 230 in function of said evaluation from among a plurality of display templates. The retrieved information is then formatted 240 in accordance with the selected template and displayed 250 in its formatted form on a display surface of the display system.

FIG. 3 illustrates three different layouts of information on a display surface, corresponding to three different display templates. It is assumed that the display system 100 described above requests information about the next stop, the estimated time of arrival (ETA), and the current time-of-day from the information system 199 to which it is connected. If all three requested fields are provided by the information system 199, and the associated metadata provides no ground for withholding any of these fields from display, the template at the top of FIG. 3 can be used. If the information system 199 is unable to provide an estimated time of arrival, or if the estimated time of arrival provided by the information system 199 is not suitable for display (for example because its associated metadata indicates that the estimate was generated at a moment in time which is too long ago, such that its accuracy can no longer be guaranteed), use of the template at the top of FIG. 3 would not be suitable, because it would leave the lower right corner of the display surface empty, or filled with an error message. In this case, the processor 140 of the display system 100 may be configured to select the template in the middle of FIG. 3. Likewise, if the information system 199 is unable to provide the time of day, it would not be appropriate to use either of the two topmost templates of FIG. 3, and the processor 140 of the display system 100 may be configured to select the template at the bottom of FIG. 3 in that case.

The invention will now be further clarified by reference to two exemplary use cases.

In a first use case, an embodiment of the invention is used to display, inside a passenger compartment of a public transportation vehicle with predetermined calling points such as a train, data about alternative transport modes that are available only at select calling points along the route.

Without loss of generality, the train is assumed to be traveling along a route that is scheduled to pass calling points A, B, C, and D.

Passengers should be informed about the availability of alternative transportation connections, e.g. tram connections, through an on-board display at calling point C only.

Prior to arrival at a calling point, the interfacing means 130 retrieves information from the information system 199 and presents it to the processing means 140.

The processing means 140 evaluates the retrieved information prior to arrival at each calling point. Based on the evaluated condition, the processing means 140 selects one or multiple display templates from the memory 120.

If the retrieved information does not contain tram connections data (calling points A, B, and D), only the templates announcing the arrival time and available train connections at the next calling point are suitable candidates to be selected from the memory 120.

If the retrieved information does contain tram connections data (C), the templates visualizing the arrival time and available train connections, the templates visualizing the tram connections at the next calling point, and the templates visualizing both train and tram connections are suitable to be selected from the memory 120.

A selection is made accordingly, and the display surface 110 renders the retrieved information using the formatting means 150 for the selected template.

In a second use case, an embodiment of the invention is used to display, inside a passenger compartment of a public transportation vehicle with predetermined calling points such as a train, data with unpredictable availability.

Without loss of generality, the train is assumed to be traveling along a route that is scheduled to pass calling points A, B, C, and D.

Advertisements should be shown to passengers on an on-board display at calling point C only.

The time at which advertisements should be shown at calling point C is unpredictable since it is determined by external factors (real-time intervention by advertising agencies, train operator companies, . . . ). Moreover, due to technical incidents such as impaired mobile internet connectivity or data server failures, the interfacing means 130 may not be able to retrieve advertisements.

Prior to arrival at a calling point, the interfacing means 130 retrieves information from the information system and presents it to the processing means 140.

The processing means 140 evaluates the retrieved information prior to arrival at each calling point. Based on the evaluated condition, the processing means 140 selects one or multiple display templates from the memory 120.

The templates visualizing advertisements are only selected from the memory 120 if the retrieved information is present (no connection issue or data server failure) and it actually contains advertisement fields.

The display surface 110 renders the retrieved information using the formatting means 150 for the selected template.

The present invention also relates to a computer program product comprising code means configured to cause a processor to carry out the steps of the method described above. The computer program product may consist of the code means provided on a computer-readable medium, such as an optical, magnetic, or semiconductor-based storage medium.

While the invention has been described hereinabove with reference to specific embodiments, this was done to clarify and not to limit the invention. The skilled person will appreciate that various modifications and different combinations of disclosed features are possible without departing from the scope of the invention.

The invention claimed is:

1. A display system arranged for displaying messages in a passenger compartment of a vehicle, the system comprising:
   a display surface;
   a memory comprising a plurality of display templates;
   interfacing means adapted to retrieve information for display from an information system;
   processing means to evaluate said retrieved information and to select a display template from among said plurality of display templates conditionally on said evaluating; and
   formatting means configured to format said retrieved information in accordance with said selected template for displaying on the display surface;
   wherein said retrieving of said information comprises receiving information in response to requesting a plurality of fields of information and wherein said evaluating of said information comprises verifying whether information has been received for each of said plurality of fields and comprises identifying at least one field with received information.

2. The display system according to claim 1, wherein said evaluating of said information further comprises evaluating metadata associated with said received information, said metadata being received along with said received information, wherein said metadata comprises one or more of an expiry time of said received information or a source of said received information.

3. A passenger vehicle comprising the display system according to claim 2, arranged in a passenger compartment of said passenger vehicle.

4. A passenger vehicle comprising the display system according to claim 1, arranged in a passenger compartment of said passenger vehicle.

5. A method for displaying messages in a passenger compartment of a vehicle, the method comprising:
   retrieving information for display from an information system;
   evaluating said retrieved information;
   selecting a display template from among a plurality of display templates conditionally on said evaluating;
   formatting said retrieved information in accordance with said selected template; and
   displaying said formatted information on a display surface of a display system;
   wherein said retrieving of said information comprises receiving information in response to requesting a plurality of fields of information and wherein said evaluating of said information comprises verifying whether information has been received for each of said plurality of fields and comprises identifying at least one field with received information.

6. The method according to claim 5, wherein said evaluating of said information further comprises evaluating metadata associated with said received information, said metadata being received along with said received information;
   wherein said metadata comprises one or more of an expiry time of said received information or a source of said received information.

7. A non-transitory computer program product comprising code means configured to allow a processor to carry out the steps of the method of claim 6.

8. A non-transitory computer program product comprising code means configured to allow a processor to carry out the steps of the method of claim 5.

* * * * *